US009618611B2

(12) United States Patent
Karlapalem

(10) Patent No.: US 9,618,611 B2
(45) Date of Patent: Apr. 11, 2017

(54) PERSONAL RADAR ASSISTANCE

(71) Applicant: NXP B.V., Eindhoven (NL)

(72) Inventor: Sainath Karlapalem, Bangalore (IN)

(73) Assignee: NXP B.V., Eindhoven (NL)

( * ) Notice: Subject to any disclaimer, the term of this patent is extended or adjusted under 35 U.S.C. 154(b) by 344 days.

(21) Appl. No.: 14/495,238

(22) Filed: Sep. 24, 2014

(65) Prior Publication Data

US 2016/0084952 A1 Mar. 24, 2016

(51) Int. Cl.
*G01S 13/08* (2006.01)
*G01S 13/93* (2006.01)
(Continued)

(52) U.S. Cl.
CPC .............. *G01S 13/08* (2013.01); *A61H 3/061* (2013.01); *A61H 3/068* (2013.01); *A61H 23/02* (2013.01);
(Continued)

(58) Field of Classification Search
CPC .......... A61H 3/06; A61H 3/061; A61H 3/068; A61H 23/02; A61H 2201/50; A61H 2201/5023; A61H 2201/5043; A61H 2201/5048; A61H 2201/5058; A61H 2201/5084; A61H 2201/5097; A61H 2003/06; A61H 2003/061; A61H 2003/063; A61H 2003/065; G01S 13/02; G01S 13/04; G01S 13/06; G01S 13/08; G01S 13/88; G01S 13/93; G01S 7/48; G01S 7/483; G01S 7/486; G01S 7/487; G01S 7/4876; G01S 13/931; G01S 17/88; G01S 17/93; G01S 17/936; G01S 19/01; G01S 19/13; G01S 19/35; G01S 19/36
See application file for complete search history.

(56) References Cited

U.S. PATENT DOCUMENTS 5,343,206 A * 8/1994 Ansaldi ................ G01S 13/931
342/179
5,479,173 A * 12/1995 Yoshioka .............. G01S 13/931
342/70

(Continued)

FOREIGN PATENT DOCUMENTS

WO   WO-03049657 A1    6/2003
WO       2013046234 A1    4/2013
WO   WO-2013/150556 A1  10/2013

OTHER PUBLICATIONS

Extended European Search Report for Patent Appln. No. 15177813.1 (Jan. 12, 2016).

*Primary Examiner* — Bernarr Gregory

(57) ABSTRACT

Various exemplary embodiments relate to a radar device for detecting objects that intersect an area, the device including a mount attachment; a radar sensor; an output interface; a memory storing one or more environment parameters; a processor in communication with the radar sensor, the output interface, and the memory, the processor being configured to: receive, from the radar sensor, signal information; retrieve, from the memory, environment parameters; calculate, based on the signal information, the distance relative to the sensor of one or more objects; calculate an area based on at least one of the environment parameters; and determine that at least one of the one or more objects intersect the area.

20 Claims, 4 Drawing Sheets

(51) Int. Cl.
  *A61H 3/06* (2006.01)
  *A61H 23/02* (2006.01)
  *G01S 13/00* (2006.01)
  *A61H 3/00* (2006.01)

(52) U.S. Cl.
  CPC ........ *G01S 13/93* (2013.01); *A61H 2003/063* (2013.01); *A61H 2003/065* (2013.01); *A61H 2201/5043* (2013.01); *A61H 2201/5048* (2013.01); *A61H 2201/5058* (2013.01); *A61H 2201/5084* (2013.01); *A61H 2201/5097* (2013.01)

(56) References Cited

U.S. PATENT DOCUMENTS

| | | | | |
|---|---|---|---|---|
| 5,689,264 A | * | 11/1997 | Ishikawa | G01S 17/936 342/70 |
| 5,731,779 A | * | 3/1998 | Kikuchi | G01S 13/931 342/174 |
| 5,754,099 A | * | 5/1998 | Nishimura | G01S 13/931 340/435 |
| 5,818,355 A | * | 10/1998 | Shirai | G01S 13/931 180/167 |
| 5,973,618 A | * | 10/1999 | Ellis | A61H 3/061 135/75 |
| 6,215,438 B1 | * | 4/2001 | Oswald | G01S 13/931 342/104 |
| 6,271,798 B1 | * | 8/2001 | Endo | G01S 19/36 342/70 |
| 6,292,752 B1 | * | 9/2001 | Franke | G01S 13/931 340/435 |
| 6,542,111 B1 | * | 4/2003 | Wilson | G01S 13/931 180/168 |
| 6,556,148 B2 | * | 4/2003 | Ellis | A61H 3/061 340/906 |
| 8,212,713 B2 | * | 7/2012 | Aiga | G01S 13/931 342/118 |
| 8,525,874 B2 | | 9/2013 | Willmann et al. | |
| 8,810,445 B2 | * | 8/2014 | Ogawa | G01S 7/4876 342/107 |
| 2014/0132388 A1 | | 5/2014 | Alalawi | |

* cited by examiner

PERSONAL RADAR ASSISTANCE

TECHNICAL FIELD

Various exemplary embodiments disclosed herein relate generally to obstacle detection using radar.

Worldwide, 285 million people are visually impaired, 39 million of who are blind and the remaining 246 million have low vision. Approximately 90% of visually impaired people live in developing countries. Historically, visually impaired people have used a variety of low-tech methods such as canes and auditory cues to detect obstacles as they move about the world. However, in the real world not all obstacles are audible, and many are not detectable at cane height.

SUMMARY

In light of the present need for inexpensive obstacle detection for visually impaired individuals, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to an obstacle detection device for detecting objects that intersect an area, the device including a mount attachment; a radar sensor; an output interface; a memory storing one or more environment parameters; a processor in communication with the radar sensor, the output interface, and the memory, the processor being configured to receive, from the radar sensor, signal information; retrieve, from the memory, environment parameters; calculate, based on the signal information, the distance relative to the sensor of one or more objects; calculate an area based on at least one of the environment parameters; and determine that at least one of the one or more objects intersect the area. In some embodiments, the area includes a cylinder. In some embodiments, the area includes one or more planes. In additional embodiments, the processor may be further configured to determine the closest object of the one or more objects; and transmit, through the output interface, feedback information about the closest object. In further embodiments, the memory further stores a log. Further embodiments include storing the feedback information in the log.

Other embodiments further include a controller in communication with the memory and the processor, the controller configured to retrieve the one or more environment parameters from the memory; and send to the processor one or more indications of the at least one of the environment parameters. In further embodiments, the controller is in communication with the radar sensor, and is further configured to receive, from the radar sensor, signal information; determine, based on the signal information, one or more new environment parameters; and send to the processor one or more indications of the one or more new environment parameters.

In some embodiments, the environment parameters include one or more of a user height, a user stride length, a device height range relative to user, a device distance from user, a distance of the area from the device, and a minimum size of object. In some embodiments, the environment parameters include area parameters. In alternative embodiments, when calculating the distance relative to the sensor of one or more objects, the processor is further configured to process signal information by means of a fast Fourier transform (FFT) process. In further embodiments, the signal information includes analog-to-digital converter (ADC) data. In further embodiments, the signal information is received by an analog-to-digital processor and converted to analog-to-digital converter (ADC) data before calculating the distance by means of a FFT process.

In other embodiments, the processor is further configured to decimate the signal information. In alternative embodiments, the processor is further configured to filter the signal information.

Some embodiments further include an energy harvester. In further embodiments, the energy harvester includes a kinetic harvester. In other embodiments, the energy harvester includes a photovoltaic harvester. In some embodiments, the radar sensor includes one or more transmitters and one or more receivers. In other embodiments, the radar sensor is configured to output a chirped radio frequency (RF) waveform. Other embodiments further include a power source; and a controller in communication with the memory and the processor, the controller configured to receive from the power source an indication of battery level; and send to the radar sensor one or more indications that sensor parameters should be changed. In further embodiments, the one or more indications that sensor parameters should be changed include one or more of an indication to reduce a chirp frequency, an indication to reduce a chirp range, an indication to use fewer transmitters, and an indication to use fewer receivers.

In some embodiments, the output interface includes an audio output. In further embodiments, the audio output includes a sound output, the sound output including one of a voice synthesizer, a tone generator, and an audio synthesizer. In alternative embodiments, the output interface includes a tactile feedback generator. In further embodiments, the tactile feedback generator includes a feedback output, the feedback output including one of a vibration motor, a low latency control chip, an electroactive polymer, a piezoelectric actuator, an electrostatic actuator, a subsonic audio wave surface actuator, pin, or a Braille display. In other embodiments, the output interface includes a wireless adapter. In some alternative embodiments, the wireless adapter includes a BLUETOOTH® IEEE 802.15.1 adapter. In some alternative embodiments, the wireless adapter includes a ZIGBEE® IEEE 802.15.4 adapter.

In some embodiments, the mount attachment includes one of a belt buckle, loop, clip, or screw threads. In some embodiments, the obstacle detection device includes a wearable device.

It should be apparent that, in this manner, various exemplary embodiments enable the visually impaired to detect obstacles at varying heights. In particular, by using a modified radar platform to detect objects that intersect the user's plane.

BRIEF DESCRIPTION OF THE DRAWINGS

In order to better understand various exemplary embodiments, reference is made to the accompanying drawings, wherein.

DETAILED DESCRIPTION

Figure 1:
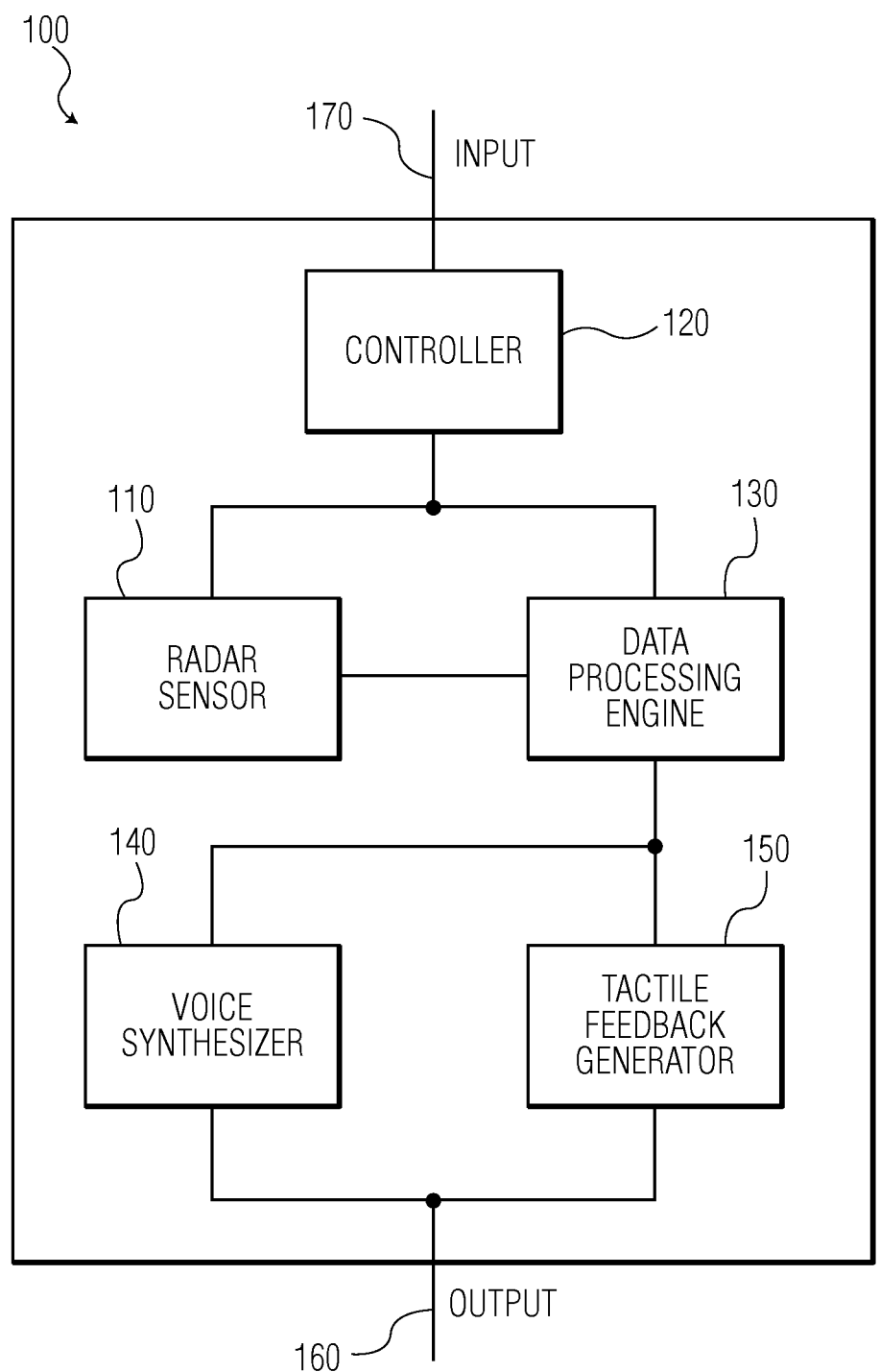
FIG. 1 illustrates a system for providing feedback to a user about nearby objects.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein. Further, while various exemplary embodiments are described with regard to a mounted obstacle detection device for use in assistance for the visually impaired, it will be understood that the techniques and arrangements described herein may be implemented to facilitate obstacle detection in other types of systems that implement multiple types of data processing or data structure.

When used for personal movement assistance, electronic sensors such as those based on ultrasound and lasers suffer from accurate obstacle detection for multiple factors. Factors such as range and azimuth are problematic due to limitations related to directionality for ultrasound and planar scanning for laser devices. In one example, ultrasound is a poor obstacle detector at the un-motorized travel speed of a user because impediments in directionality limit the accuracy in determining the spatial position of an edge to 10-50 cm, depending on the distance to the obstacle and the angle between the obstacle surface and the acoustic beam. One of the drawbacks of laser based devices is that the scans are planar, which means that if an obstacle is above or below the scanning plane then nothing is detected. This drawback may be overcome to some extent by the use of multiple laser sensors, but this results in more expensive devices and higher power usage (which as a result limits either the usability of the devices over a long duration, or significantly adds to the weight of the device because of increased battery size). These sensors also suffer from reading inaccuracies caused by dust, rain, blowing snow, and other air-borne particulates common to outdoor as well as indoor environments. In view of the foregoing, it would be desirable to develop a low-cost device to enable the visually impaired to detect obstacles at varying heights.

Radar sensors are suited to help visually impaired persons navigate through both indoor and outdoor environments; radar implementations may provide precise feedback of obstacle parameters. Radar sensors use RF transmissions which have a relatively wide field of view that enables direction determination at varying heights, facilitating robust and accurate obstacle detection. Radar sensors may be accurate to a range of distances (from the sensor to the detected object) and at a granularity useful to a user including relatively short distances of potential obstructions such as in a kitchen or laboratory, or at distances to allow obstacle detection while moving about on foot or in a personal conveyance such as a bicycle, kayak, roller blades, etc. Additionally, readings from radar sensors may be updated frequently without interference caused by earlier readings (e.g. crosstalk). A system including radar sensors, signal processing devices, and obstacle detection feedback devices may be included in portable or wearable devices, and/or attached or mounted onto or incorporated into already-existing tools such as a cane. These devices may convey auditory and/or physical (for example, vibratory, haptic, or tactile) feedback to the user about the range, height, speed of approach, and azimuth of objects near to or in the path of the user. Finally, compared to laser sensors with suitable range, radar sensors are relatively low cost.

Referring now to the drawings, in which like numerals refer to like components or steps, there are disclosed broad aspects of various exemplary embodiments.

FIG. 1 illustrates a system 100 for providing feedback to a user about nearby objects. System 100 includes a radar sensor 110, a controller 120, a data processing engine 130, a voice synthesis 140, a tactile feedback generator 150, an output 160, and an input 170. System 100 may include components repurposed from an integrated radar application including a radar sensor 110, a radar processing chip embedded in or taking the place of a data processing engine 130 (e.g. range/speed/azimuth detection algorithm processing), voice synthesis 140 of detection parameters to be sent out to a wired or wireless output 160, for example, through a BLUETOOTH® IEEE 802.15.1 transceiver to a BLUETOOTH® IEEE 802.15.1 headset for auditory feedback.

Radar sensor 110 may be one or more radar transmitter/receiver sets incorporated into an integrated circuit (IC) for use over a range of distances and at a granularity useful to a user moving about an environment. The number of transmitters and receivers included in the sensor package 110 may vary depending on a variety of factors including physical implementation of the device (e.g. in a cane, helmet, or separate portable device), power consumption needs, range and/or granularity specifications, and desired use cases. For example, radar sensor 110 may be a sensor with characteristics useful in motorized applications. Radar sensor 110 may have one or multiple transmitter/receiver configurations that may be used to determine the range, azimuth, and speed of approach of the obstacles in an adjustable range of distances, where the range parameters may be varied depending on the obstacle environment or user selection. In one embodiment, radar sensor 110 may include multiple transmitters and receivers. Radar sensor 110 may be targeted for short range or ultra-short range use cases (relative to other radar uses, such as to detect objects while in a moving automobile) for example, with range on the order of 50 cm-10 m with resolution of 50 cm. For example, radar sensor may have a bandwidth of 100 MHz to 1 GHz, and chirp on time of 3.3 ns to 33.3 us. Further use cases and parameters of the radar sensor 110 are discussed below. System 100 may have different modes of operation depending on the use case, where the mode of operation is selectable by the user and/or determined by the controller 120. The radar sensor may be configurable to detect objects across an adjustable range; for example, the range specification may be extended to detect objects at minimal distance of 50 cm. The range may be adjusted by the user through a user interface connected through input 170 to controller 120. Controller 120 may communicate with sensor 110 to adjust the radar to the selected range.

The controller 120 may receive and transmit parameters relevant to the range and processing of radar data received by radar sensor 110 and data processing engine 130. For example, as already noted, the sensor or detection range may be adjusted by the user through a user interface connected through input 170 to controller 120. The controller 120 may also adjust range and processing settings in order to manage power consumption, for example, if available power reserves drop below one or more thresholds. The controller 120 may automatically adjust the mode of operation, including range, processing settings, and number of transmitters or receivers in use if various conditions are detected, for example, a number of objects, the speed at which objects are approaching, the proximity of objects, or the number of objects in proximity. In some embodiments the controller 120 may be paired with other sensors in system 100 or in communication with system 100 (e.g. via a smart phone via BLUETOOTH® IEEE 802.15.1 , Wi-Fi, ZIGBEE® IEEE 802.15.4, or other means of wireless communication), for example an accelerometer or location-based sensor (e.g. GPS, cell, or Wi-Fi-based), and may change modes in response to readings communicated through those sensors such as location, changes in speed, or other factors.

The controller 120 may also accept as inputs parameters related to the user such as the user's height or stride length, or an intended use such as walking, biking, or indoor work, and make appropriate adjustments to range and granularity. For example, in order to detect only obstacles that intersect the azimuth of a user's plane, the controller 120 may be programmed with various parameters such as the user's height and a range of heights and angles at which the user typically holds a cane so that the height and angle of the device 100 relative to the user's plane is known. The programming may be received as inputs from a user interface or configuration files, or may be learned in a training exercise through usage, e.g. by having the user navigate through known configurations of objects in order to determine to determine the necessary parameters. Likewise, these settings may be adjusted if, for example, the device 100 is moved from a cane onto a bicycle, whereby the location of the device relative to the user's plane may change, and in fact aspects of the user's plane such as the user's height may also change. Controller 120 may be programmable to have the capability to add parameters for modes of operation related to new use cases, to edit parameters relating to existing use cases, or to delete use cases.

Data processing engine 130 may include components to determine obstacle attributes by means of fast Fourier transform (FFT) processing on analog-to-digital converter (ADC) data. Data processing engine 130 may include a radar signal processing platform (for example, NxP's LPC4370 MCU platform) for determining the range attributes of an object by means of high speed data acquisition with ADC sampling and carrying out FFT processing on ADC data for range, azimuth, and other attributes. Although depicted as a single module, data processing engine 130 may include multiple modules, which may be integrated or distributed. Data processing engine 130 may include, for example, an analog-to-digital converter or other signal processor to convert signal information; as well the radar signal processing platform, which may itself include separate modules for high speed data acquisition with ADC sampling and carrying out FFT processing; and other modules Likewise, in some embodiments sensors and associated signal processing, as well as other aspects of system 100 may be integrated, for example, data processing engine 130 may be further integrated with other system components such as radar sensor 110, controller 120, or other sensors or components of system 100. Decision making on obstacle presence may be done over multiple chirp cycles. The obstacle attributes determined at the data processing engine and communicated to the user may include range, height, azimuth, speed of approach, among others. Controller 120 may communicate with data processing engine 130 to indicate the selected range.

Various use cases may require different radar sensor range and data processing engine capability, for example, a device used for walking may require different range and granularity than a device used for biking. Various device parameters may differ in these applications, for example, analog filter cut off frequencies, chirp slope parameters including bandwidth and chirp on time, digital filter cut off frequencies, decimation ratio, and number of FFT points. For example, in use cases where a 0.5 m-10 m range is desired, the radar sensor 110 may have a chirp time of 3.3 ns to 33.3 and a radar bandwidth of 100 MHz to 1 GHz; and the data processing engine 130 may include a band pass filter on ADC data supporting a range around 2 MHz, and 128 FFT points. Various implementations of the radar sensor 110 may have different bandwidth ranges, and may include high pass and/or low pass filters with a cutoff frequency or frequencies to support detection of obstacles at varying ranges, including detecting obstacles around a visually impaired user moving through an environment at varying speeds, for example, in a home, walking, or biking. Power consumption considerations may also influence components used in system 100 as discussed below. For example, a low power 128 point fast Fourier transform (FFT) processor may be used for obstacle range determination with 30 cms range resolution. ADC sampling frequency in the range of 400 KHz to 8 MHz may also be suitable for the desired range and frequency. Data processing engine 130 may also apply a windowing operation on the filtered signal to reduce noise from the side lobes.

System 100 may include one or both of a voice synthesizer 140 and a tactile feedback generator 150. Voice synthesizer 140 may provide auditory synthesis for auditory feedback of object detection and transmission of voice information through output 160 over a low power BLUETOOTH® IEEE 802.15.1 or ZIGBEE® IEEE 802.15.4transceiver or other wireless or wired auditory device, for example, to a blue-tooth enabled headset or hearing aid. A BLUETOOTH® IEEE 802.15.1 or ZIGBEE® IEEE 802.15.4transmitter may allow a third-party observer to monitor the feedback received from the user. In some embodiments, feedback may be logged textually or as a sound recording, for example, for evaluation or training purposes. The feedback of the presence of obstacle may also or in the alternative be a simple sound tone or vibration (pop or ping) whose intensity, pitch, or rhythm may be increased based on how close is the obstacle. Tactile feedback generator 150 may provide physical synthesis for physical feedback of object detection and transmission of information through output 160. Tactile feedback may be vibratory, haptic, or other tactile stimulus, for example, a vibration with varying intensity depending on the proximity of the obstacle, or a set of protrusions (bumps, blunt pins, etc.) or depressions (for example, in the handle of a cane) that are raised or lowered as signaled through output 160 depending on the direction of an object.

Although not shown, the system power source may be any suitable portable power source, which may be rechargeable, including, in some instances, when the system is in use. Because system 100 may be a critical tool for a user to function in their environment, it is desirable to extend the battery life and thus the active battery time of the system. The system 100 may optimize power consumption in a number of ways. Note that standard radar applications operate in the 5-96 GHz range. These sensors may be reused for system 100 as radar sensors 110. Detection for objects at the travel speed and relevant distance for a visually impaired user may operate in the 5-15 GHz range by sweeping a smaller range of the available frequency band, thus using far less power to operate.

Likewise, radar systems for motorized or other uses (e.g. automotive radar sensors) may use increased FFT points (for example, 256, 512, 1024 etc.) for signal analysis because of the distances and speeds involved, whereas, because for system 100 the range specification may be more limited, for example, to a range on the order of tens of meters or less, the data processing engine 130 may use 128 FFT points, which will also consume less power than a motorized-use system that may detect objects at greater distances and approaching at greater speeds. The number of FFT points is directly proportional to the beat frequency, bandwidth, range resolution and chirp time. The value of chirp time and bandwidth are dictated by the range at which objects should be detected. In high-speed and long-distance applications (relative to personal distance and motion), higher bandwidths, beat frequencies, and chirp time allow the collection of increased FFT points. If the bandwidth, chirp time and beat frequency are reduced, fewer FFT points may be collected.

Note that in some use cases where a longer range of greater than 10 meters may be required, e.g. for biking or running, the cutoff points for a low pass filter may be adjusted, and increased beat frequencies and greater chirp times supported, but in most applications the frequency range would remain lower than that used for motorized radar applications. With such low pass filtering, only the signal reflections in the desired range may be analyzed (processed by the data processing engine 130). In some implementations where the range specification is increased to detect obstacles at greater distance or approach speed (for example, when detection of an approaching car is necessary), the detection parameters may necessitate additional FFT points. Methods of extending battery life for some of these applications are discussed below.

Some implementations may reduce the frequency of the radar band used so that a lower frequency band (e.g. 2 GHz) is used and/or reduced signal is detected (resulting in fewer FFT points in signal processing), reducing or eliminating the use of signal decimation or low pass filtering, which may result in power savings, but may also lead to additional design complexities, and increase the risk of signal interference from other sources (for example, at the BLUETOOTH® IEEE 802.15.1 range of 2.4 GHz interference is possible because many applications use this frequency range).

Figure 2:
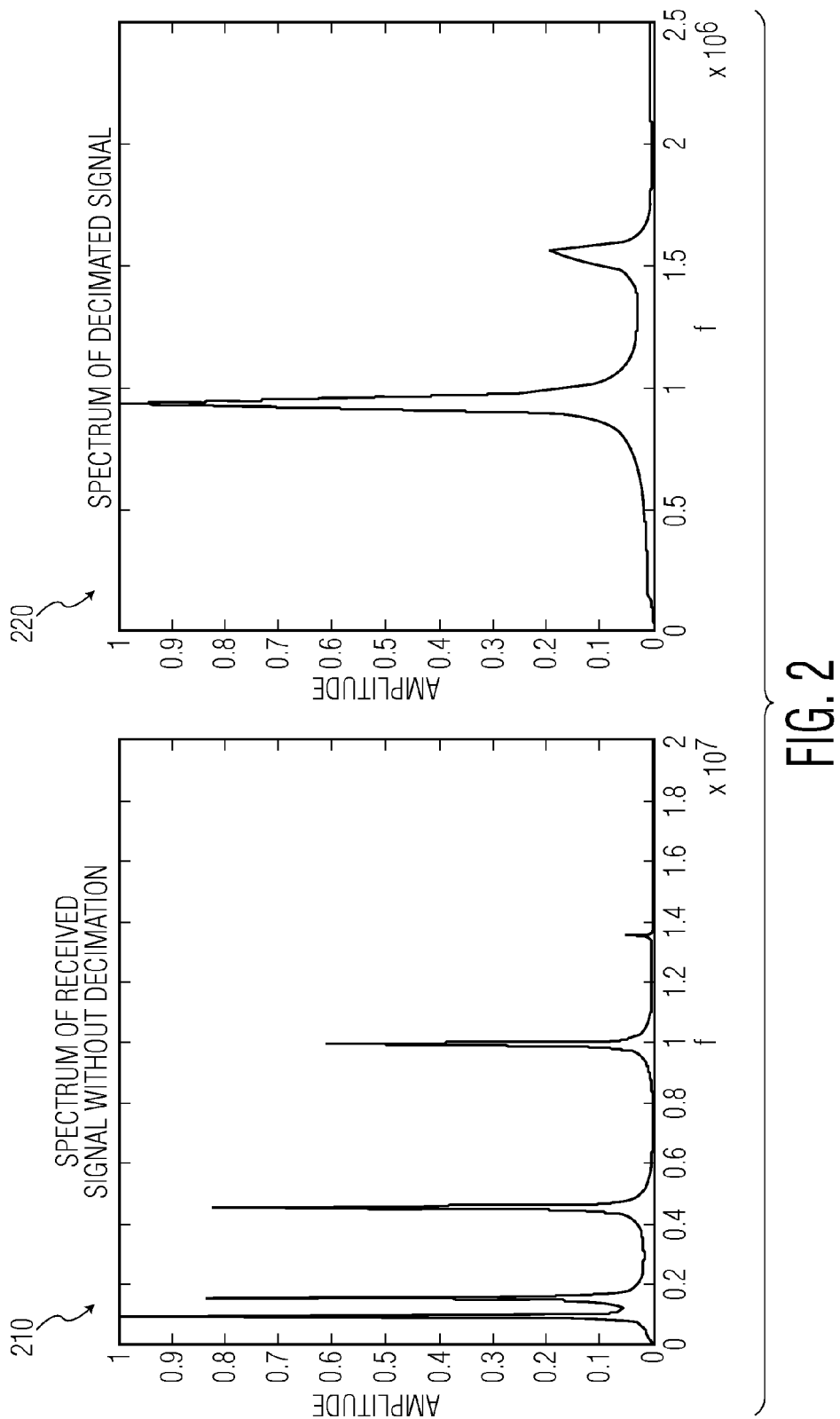
FIG. 2 illustrates the spectrum of a signal received from a radar sensor model before and after decimation.

FIG. 2 illustrates the spectrum of a signal received from a radar sensor model such as a model of sensor 110 before decimation 210 and after decimation 220. As described above, the spectrum of the signal before decimation 210 requires 1024 FFT points to process, but the decimated signal 220 requires 128 FFT points to process, reducing the processing (number of cycles) to render the signal into usable data, resulting in lower power consumption.

Additional optimizations may be possible to extend the active battery time of system 100 even further. System 100 may include energy harvesting means for increasing the active time of the system, for example, piezoelectric crystals or fibers, photovoltaics, and/or kinetic harvesters. Power reducing settings may be configurable by a user. The controller 120 may include methods to reduce power consumption, for example, to reduce chirp frequency or range, reduce the number of radar frequency transmitters and/or receivers in use, reducing the scanning frequency of the radar sensor (where the rate of speed is reduced e.g. at walking speed or during indoor use, fewer scans are necessary to update environment data such as detected objects intersecting the user's plane), reducing power usage of data processing engine 120 (e.g. by reducing or increasing the clock frequency of the signal processing engines, in turn reducing or increasing the number of processing cycles of data processing engine 130 under certain conditions), or to turn the system off when dormant for a period of time. Some applications with greater power usage due to increased range and frequency of scanning, such as bicycling, may allow an offset of the increased power usage by, for example, adding a power generator to the bicycle wheel to power the device 100—as another example, the power drain caused by the increased scanning frequency necessitated by activities such as running may be offset by a kinetic charger.

With regards to the chirp frequency, because the range is relatively low, the chirp time may be lowered. The range may be equal to C [speed of light]*Beat Frequency*Chirp Time/Bandwidth. Although a range of ten meters may suggest a chirp time of 3.3 ns, it may not be possible to sweep the frequency range, e.g. 100 MHz to 1 GHz, at appropriate intervals, e.g. 10-100 MHz, within 3.3 ns. At an appropriate frequency range with low pass data filtering and signal decimation as described above, the chirp time may be adjusted upwards. With range specifications of 50 centimeters to 10 meters, the chirp time may be 3.3 ns to 33.3 us, the beat frequency may be 100 Khz to 2 MHz in the increment of 39 KHz (corresponding range resolution of 30 cm), the sampling frequency may be 400 KHz to 10 MHz, and the bandwidth may be 100 MHz to 1 GHz. As an illustration, in a system 100 with a desired range specification of 0.5 m to 10 m using a radar sensor 110 with a range specification of 0.5 m to 50 m, appropriate high pass and low pass filter cutoff frequencies, an up chirp time in the range of 3.3 ns to 33.3 us, a bandwidth in the range of 100 MHz to 1 GHz, and a sampling frequency in the range of 400 KHz to 8 MHz, a beat frequency less than or equal to 2 MHz for detection of objects at distance of less than or equal to 10 meters. As described above, different range specifications for different applications, and/or using different radar sensors, may use different configurations to achieve the desired range; the parameters for a sensor or sensor package may be adjusted depending on the mode chosen by the user.

Figure 3:
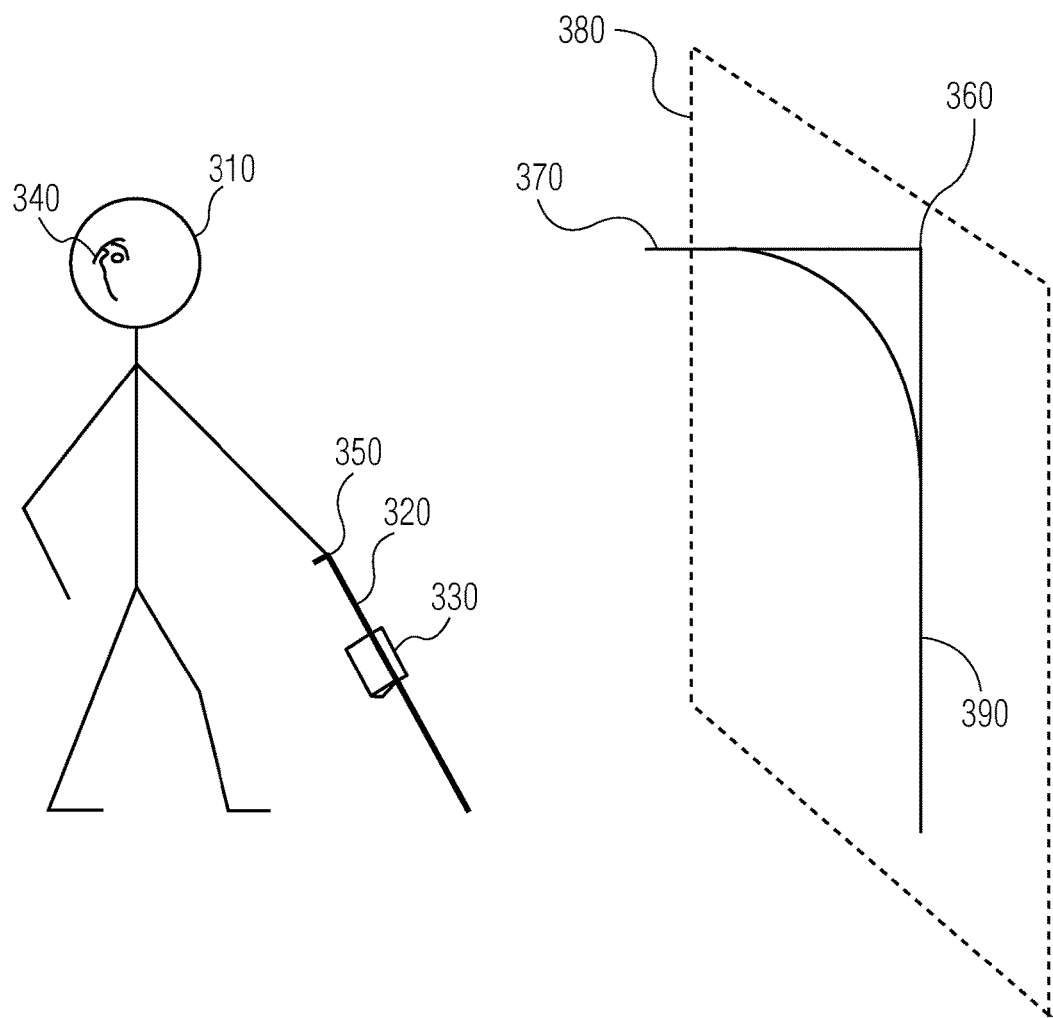
FIG. 3 illustrates an implementation of an obstacle detection device mounted on a cane.

FIG. 3 illustrates an implementation of a device 330 mounted on a cane 320 and suited to help visually impaired persons such as a user 310 navigate through both indoor and outdoor environments with obstacles 360. Device 330 may integrate a system such as system 100. A user 310 may wear a BLUETOOTH® IEEE 802.15.1-enabled headset 340 to listen to auditory or vibratory feedback transmitted from device 330. Device 330 may be mounted onto an existing cane 320, or may be integrated into cane 320, or worn by the user 310 as a portable device 330 (e.g. on a strap or in a pocket), held by the user 310, or attached to or integrated into another wearable format such as a hat, helmet, belt, or vest. A cane 320 may be used as an alternative manual detection method in instances where the battery life of the device 330 is predicted to be exceeded by the usage time. Cane 320 may include kinetic harvesters so that the sweeping motion used to detect objects with the cane may recharge the device 330. The handle 350 of cane 320 may include physical output such as haptic, or vibratory, or other tactile feedback mechanisms as described above, or such feedback mechanisms may be mounted onto the cane, as a replacement for or in addition to an existing handle.

An obstruction such as object 360 may intersect with a user 310 at any height relative to the user, and different points of an object 360 may or may not present as an obstruction to a particular user 310. For example, the leading edge 370 of a protrusion from an object 360 may intersect a plane 380 of the user 310 prior to another point 390 on the object 360 that is also in the user's path. As already noted, a controller 120 in the device 330 may be programmed with the height of the user 310, so that if the protrusion 370 of the object 360 is below the person's height such that it causes an obstruction to the user 310, the device 330 will provide feedback through headset 340 or handle 350 indicating the object is an obstruction, but if the protrusion 370 of the object 360 is above the person's height, it may be detected by the device 330 but not reported to the user 310, or the range of the device 330 may be set such that the protrusion 370 is not detected by the device 330. Further, the device may detect the protrusion 370 and a portion 390 of the object 360 that is in the user's path, and report the closest point that presents an obstruction to the user 310, for example, the point 390 that is below the user's height (assuming that the protrusion 370 is closer to the plane 380 of the user 310 but above the user's height), or whichever point is closer to the user if both parts of the object 360 present obstructions (because they both are in the plane 380 of the user and below the user's height). In some implementations, multiple obstructions may be reported, for example, using different tones and rhythms to indicate direction, proximity, height, and/or speed of approach. In some implementations, a combination of feedback may be used such as tines, verbal warnings, and tactile feedback.

Note that although plane 380 is shown as a flat plane, in some embodiments plane 380 may be understood to tangentially intersect a cylinder around user 310 such that obstacles may be detected surrounding the user nearly omni-directionally. As noted above, the sensor or detection range may be altered. Included in parameters that may be set relative to obstacle detection in the environment may be whether detection is for obstacles only in the direction of movement, front and back, diagonal to, or all around the user, e.g. a roughly cylindrical area tangentially intersected by plane 380. Range settings may be separately indicated for areas around the user 310—note that, for example, if device 330 is three meters from user 310 and plane 380 is six meters from user 310 and three meters from device 330, if device 330 is set to detect front and back obstacles intersecting planes at equal distances from the device, obstacles directly behind user 310 will be detected. Further, if device 310 is a wearable device, sensors may be placed to detect objects only to the front of user 310, or may be dispersed in front of and behind user 310 such that different sensors may detect obstacles in different directions.

Thus, range settings may be altered, for example, by selecting different modes of operation, and thus altering the device 330 environment parameters, such that obstacles in directions other than the direction of movement may be detected at different distances, in which case an area around the user 310 at which obstacles are detected may be an elliptic, parabolic, or hyperbolic cylinder, or multiple planes in different directions at the same or different directions from the user. Additionally, feedback may be differentiated depending upon the direction from which an obstacle intersects the area around the user, e.g. by vocal feedback or by varying tone, pitch, rhythm, force, volume, or rapidity of audio or physical feedback.

Although system 100 above is described with respect to radar-based obstacle detection, system 100 may be used with other types of detection alone or in combination to detect obstacles 360 with respect to a user 310. For example, a personal assistance system as described above may use other sensors, e.g., sensor fusion, to enhance the detection of objects. For instance, a camera may be used in combination with the radar detection described for herein, so as to enable obstacle classification. As an example of object classification, the object may be initially be detected using a radar sensor 110, but information from a camera may be used to identify the object as a specific feature, for example, as a staircase. A camera module may be added to the device 100, and/or data processing engine 130 may be configured to perform sensor fusion.

Figure 4:
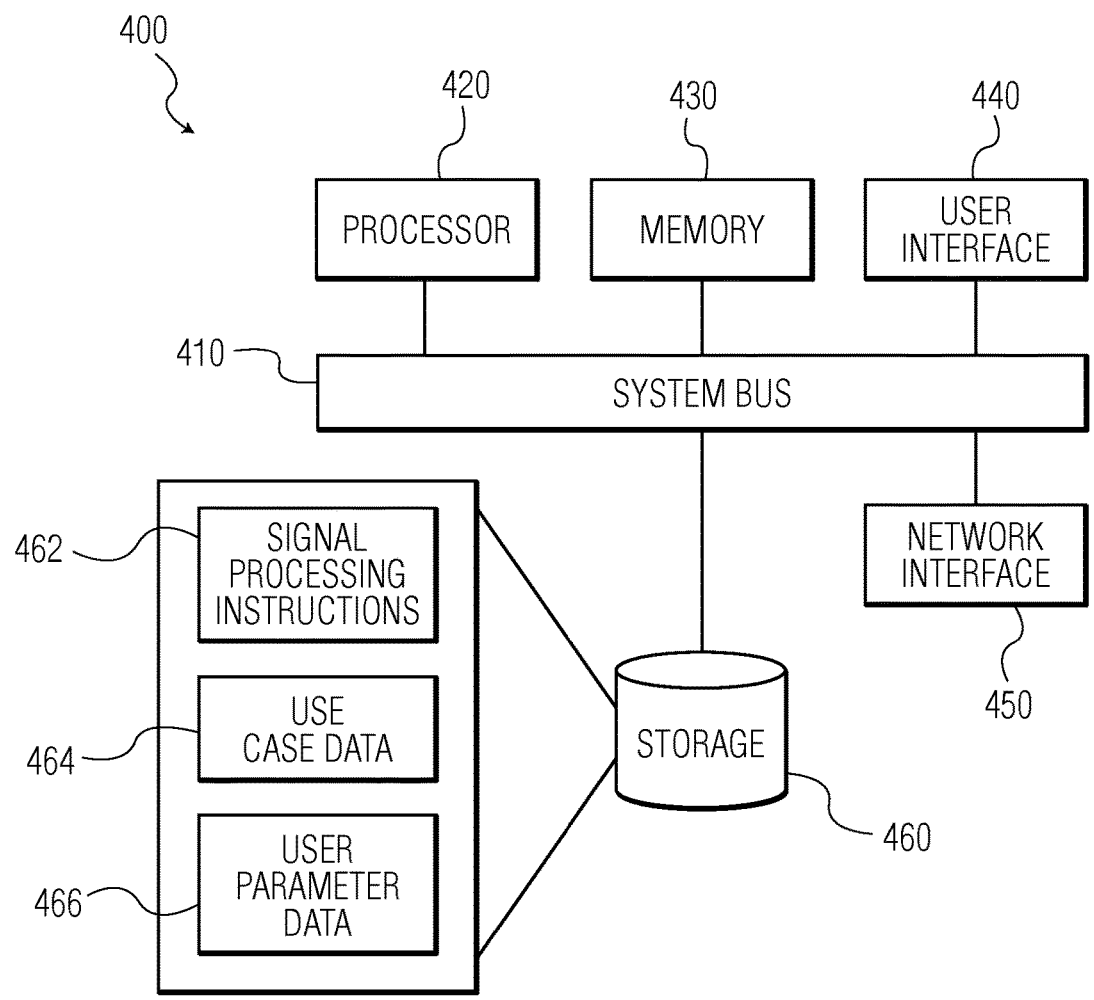
FIG. 4 illustrates an exemplary hardware diagram for a device including a radar detection processing engine.

FIG. 4 illustrates an exemplary hardware diagram for a device 400 such as device including a radar based object detection processing engine in a system. The exemplary device 400 may correspond to the device 330 of FIG. 3. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460. As such, the processor may include a microprocessor, field programmable gate array (FPGA), application-specific integrated circuit (ASIC), or other similar devices.

The memory 430 may include various memories such as, for example L1, L2, or L3 cache or system memory. As such, the memory 430 may include static random access memory (SRAM), dynamic RAM (DRAM), flash memory, read only memory (ROM), or other similar memory devices.

The user interface 440 may include one or more devices for enabling communication with a user such as an administrator. For example, the user interface 440 may include a display, a voice synthesizer, a mouse, a voice recognizer, a mechanical switch, a keyboard, or other appropriate interface for receiving user commands, for example, from a visually impaired user.

The network interface 450 may include one or more devices for enabling communication with other hardware devices. For example, the network interface 450 may include a network interface card (NIC) configured to communicate according to the BLUETOOTH® IEEE 802.15.1 or ZIGBEE® IEEE 802.15.4 protocols. Additionally, the network interface 450 may implement a ZIGBEE® IEEE 802.15.4 or BLUETOOTH® IEEE 802.15.1 protocol stack for communication according to one or more of the ZIGBEE® IEEE 802.15.4or BLUETOOTH® IEEE 802.15.1 protocols including but not limited to AVCTP, AVDTP, AVRCP, BNEP, LMP, L2CAP, SDP, TCS, HCI, RFCOMM, ZDO, ZBOSS, Z-Stack, ZIGBEE® IEEE 802.15.4 Pro, and adopted protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store signal processing instructions 462 for performing analysis of radar signals according to the concepts described herein. The storage may also store use case data 464 and user parameter data 466 for use by the processor executing the signal processing instructions 462.

According to the foregoing, various exemplary embodiments provide for obstacle detection using radar. It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. An obstacle detection device for detecting objects that intersect an area, the device comprising:
   a mount attachment;
   a radar sensor;
   an output interface;
   a memory storing one or more environment parameters;
   a processor in communication with the radar sensor, the output interface, and the memory, the processor being configured to:
      receive, from the radar sensor, signal information;
      retrieve, from the memory, environment parameters;
      calculate, based on the signal information, the distance relative to the sensor of one or more objects;
      calculate an area based on at least one of the environment parameters; and
      determine that at least one of the one or more objects intersect the area.

2. The obstacle detection device of claim 1, wherein the area comprises a cylinder.

3. The obstacle detection device of claim 1, wherein the area comprises one or more planes.

4. The obstacle detection device of claim 1, the processor being further configured to:
   determine the closest object of the one or more objects; and
   transmit, through the output interface, feedback information about the closest object.

5. The obstacle detection device of claim 1, further comprising a controller in communication with the memory and the processor, the controller configured to:
   retrieve the one or more environment parameters from the memory; and
   send to the processor one or more indications of the at least one of the environment parameters.

6. The obstacle detection device of claim 5, wherein the controller is in communication with the radar sensor, and is further configured to:
   receive, from the radar sensor, signal information;
   determine, based on the signal information, one or more new environment parameters; and
   send to the processor one or more indications of the one or more new environment parameters.

7. The obstacle detection device of claim 1, wherein the environment parameters comprise one or more of a user height, a user stride length, a device height range relative to user, a device distance from a user, a distance of the area from the device, and a minimum size of object. relative to the sensor of one or more objects, the processor is further configured to process signal information by means of a fast Fourier transform (FFT) process.

8. The obstacle detection device of claim 7, wherein the processor is further configured to decimate the signal information.

9. The obstacle detection device of claim 7, wherein the processor is further configured to filter the signal information.

10. The obstacle detection device of claim 1, wherein the environment parameters comprise area parameters.

11. The obstacle detection device of claim 1, wherein when calculating the distance relative to the sensor of one or more objects, the processor is further configured to process signal information by means of a fast Fourier transform (FFT) process.

12. The obstacle detection device of claim 1, further comprising an energy harvester.

13. The obstacle detection device of claim 12, wherein the energy harvester comprises a kinetic harvester.

14. The obstacle detection device of claim 12, wherein the energy harvester comprises a photovoltaic harvester.

15. The obstacle detection device of claim 1, further comprising:
   a power source; and
   a controller in communication with the memory and the processor, the controller configured to:
      receive from the power source an indication of battery level; and
      send to the radar sensor one or more indications that sensor parameters should be changed.

16. The obstacle detection device of claim 15, wherein the one or more indications that sensor parameters should be changed comprise one or more of an indication to reduce a chirp frequency, an indication to reduce a chirp range, an indication to use fewer transmitters, and an indication to use fewer receivers.

17. The obstacle detection device of claim 1, wherein the output interface comprises an audio output.

18. The obstacle detection device of claim 1, wherein the output interface comprises a tactile feedback generator.

19. The obstacle detection device of claim 1, wherein the output interface comprises a wireless adapter.

20. The obstacle detection device of claim 19, wherein the wireless adapter comprises an IEEE 802.15.1 adapter.

* * * * *